United States Patent
Wang et al.

(10) Patent No.: US 7,551,648 B2
(45) Date of Patent: Jun. 23, 2009

(54) SUPERIMPOSED TRAINING FOR MULTIPLE ANTENNA COMMUNICATIONS

(75) Inventors: Jibing Wang, Plainsboro, NJ (US);
Xiaodong Wang, New York, NY (US);
Mohammad Madihian, Plainsboro, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 576 days.

(21) Appl. No.: 11/277,651

(22) Filed: Mar. 28, 2006

(65) Prior Publication Data
US 2007/0041463 A1    Feb. 22, 2007

Related U.S. Application Data

(60) Provisional application No. 60/710,063, filed on Aug. 22, 2005.

(51) Int. Cl.
*H04J 3/06* (2006.01)
(52) U.S. Cl. ...................................... 370/503; 370/350
(58) Field of Classification Search ......... 370/503–509, 370/349–350
See application file for complete search history.

(56) References Cited

U.S. PATENT DOCUMENTS

| | | | |
|---|---|---|---|
| 7,197,282 B2 * | 3/2007 | Dent et al. ................ | 455/67.14 |
| 7,366,248 B2 * | 4/2008 | Wang et al. ................ | 375/267 |
| 7,433,419 B2 * | 10/2008 | Yun et al. .................... | 375/296 |

\* cited by examiner

*Primary Examiner*—Phuc H Tran
(74) *Attorney, Agent, or Firm*—Joseph J. Kolodka

(57) ABSTRACT

A training-based transmission technique for multiple-antenna communication systems is disclosed herein where the transmitted symbols are a superposition of the training symbols and the data symbols.

10 Claims, 8 Drawing Sheets

SUPERIMPOSED TRAINING FOR MULTIPLE ANTENNA COMMUNICATIONS

This application claims the benefit of and is a non-provisional of U.S. Provisional Application No. 60/710,063, entitled "SUPERIMPOSED TRAINING-BASED LINEAR DISPERSION SYSTEMS FOR NONCOHERENT MIMO COMMUNICATIONS," filed Aug. 22, 2005, the contents of which are incorporated herein by reference.

BACKGROUND OF INVENTION

The invention relates generally to training techniques for multiple-antenna communications.

An effective approach to increasing the data rate as well as the power efficiency over wireless channels involves introducing temporal and spatial correlation into signals transmitted from different antennas. A multiple-antenna communication system can achieve very high data rates with low error probabilities, in particular when the receiver has knowledge of the wireless channel response. For noncoherent channels, training-based schemes are generally employed, in which known signals (pilots) are periodically transmitted for the receiver to learn the channel. The transmission consists of two phases, namely, a training phase and a data transmission phase. In the training phase, the transmitter dedicates $T_T$ time intervals out of a total T coherent intervals for transmitting pilot symbols.

For conventional training-based schemes, no information is sent during the training period. This may lead to low spectral efficiency, especially for high-rate communications with a short coherent interval. For delay-limited channels with a finite SNR, conventional training-based schemes may not be optimal.

SUMMARY OF INVENTION

A training-based transmission technique for multiple-antenna communication systems is disclosed herein where the transmitted symbols are a superposition of the training symbols and the data symbols. The information symbols and the training symbols are arranged so that the training symbols are not transmitted in a single training phase but are instead interspersed with the information symbols in a superimposed transmission. The receiver can then use its knowledge of the training symbols and of the arrangement of training symbols within the superimposed transmission to generate an estimate of characteristics of the communication channel. The superimposed transmission of training symbols and information symbols advantageously can occupy the whole coherent interval. When utilized with linear dispersion coding, the technique provides for simple encoding and efficient suboptimal decoding. Simulation-based optimization techniques together with gradient estimation can be used to optimize the system performance.

These and other advantages of the invention will be apparent to those of ordinary skill in the art by reference to the following detailed description and the accompanying drawing.

DETAILED DESCRIPTION

Figure 1:
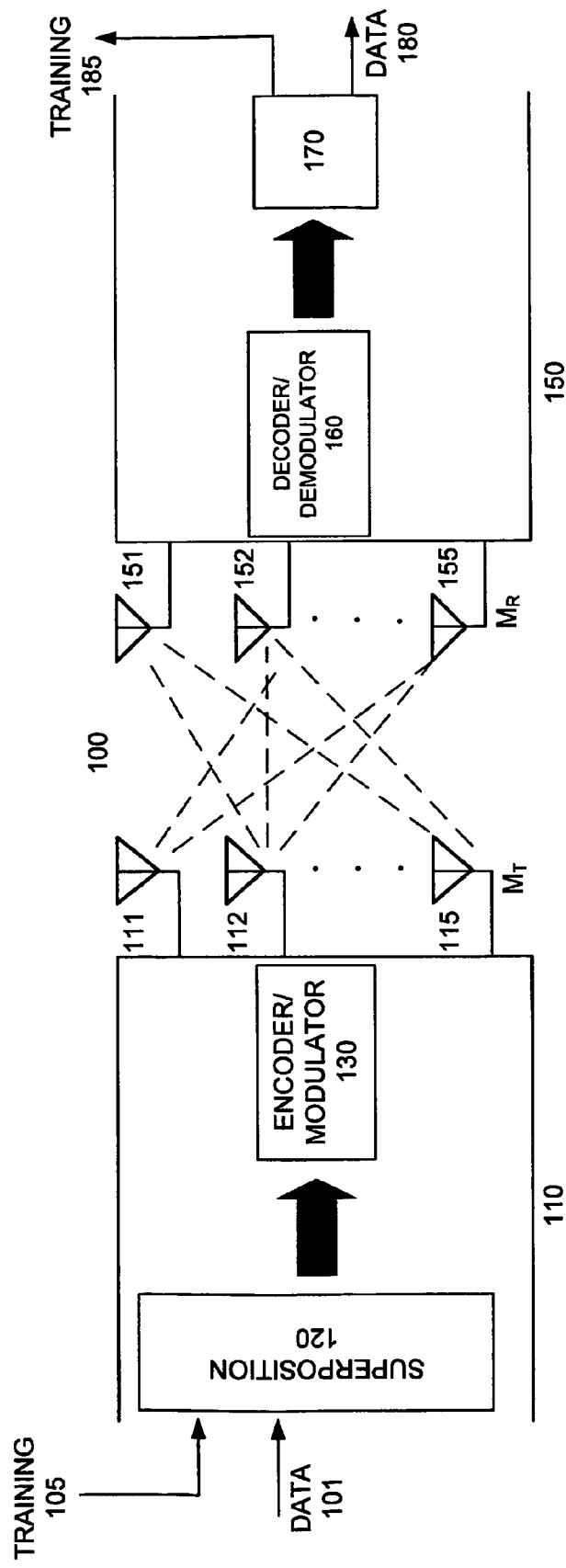
FIG. 1 illustrates a multiple-input multiple-output (MIMO) system arranged in accordance with an embodiment of the present invention.

FIG. 1 illustrates a multiple-antenna transmitter and receiver structure arranged to implement training in accordance with an embodiment of an aspect of the invention. The transmitter 110 has $M_T$ transmit antennas 111, 112, ... 115. The receiver 150 has $M_R$ receive antennas 151, 152, ... 155. It is assumed that the channel 100 is frequency non-selective and remains constant for T symbol intervals, and changes independently from one realization to another.

The transmitter 110 receives data signals 101 and training signals 105. The training signals 105 are generated using known techniques. The training signals 105 are known to both the transmitter 110 and the receiver 150. The transmitter 110 converts the data signals 101 and training signals 105 using modulation and coding techniques into sequences of symbols which are transmitted by the transmit antennas 111, 112, ... 115. Rather than dividing the coherence interval of length T into a training phase and a transmission phase, the transmitter 110 is configured so as to arrange a superposition of training symbols and data symbols which can occupy the whole coherence interval. It should be noted that the present invention is not limited to a specific superposition arrangement of the training symbols and the data symbols, and that the arrangement can be configured to vary from interval to interval. The selected superposition arrangement of training symbols and data symbols is assumed to be known to the receiver 150. Accordingly, the receiver 150 can use its knowledge of the training symbols and of the superposition arrangement of the training symbols to gain knowledge of the channel 100 and to use its knowledge of the channel to help decode the data signals at 180.

The detailed operation of the transmitter 110 and the receiver 150 can be more formally described as follows. The symbols transmitted by the transmitter can be represented by a $T \times M_T$ matrix X. The transmitted matrix X would have the following form $$X = X_T + X_d \quad (1)$$

where $X_T$ is a matrix representing the training symbols known to both the transmitter and the receiver, and $X_d$ is a matrix representing the data symbols containing the information to be transmitted. Note that the conventional training-based scheme of a training phase and a data transmission phase can be represented by the special case of when $X_T = [I 0]^T$ and $X_d = [0 \times]^T$. Thus, the conventional training-based scheme can be considered as a time-division multiplexing (TDM) of the training and data symbols. The present disclosed technique, on the other hand, can be considered more generalized and similar to a code-division multiplexing (CDM) arrangement of the training and data symbols.

The input-output relationship between the transmitter and the receiver can be written in matrix form as $$Y = \sqrt{\rho} X H + W, \quad (2)$$

where Y is a $T \times M_R$ matrix representing the received symbols, W is a $T \times M_R$ matrix of additive white Gaussian noise, and H is an $M_T \times M_R$ channel matrix. Consider the Rayleigh fading scenario, i.e., the $M_T \times M_R$ elements of H are composed of independent identically-distributed circularly symmetric complex Gaussian random variables with zero mean and unit variance. Impose a normalization $E\{tr(XX^H)\} = T$. The value $\rho$ is the expected SNR at each receive antenna regardless of the number of transmit antennas. In the absence of the channel state information H at the receiver, conditioned on the transmitted signal matrix X, the received signal Y has independent and identically distributed columns. At each antenna, the received T symbols are complex Gaussian random variables with zero mean and a covariance matrix given by $\Lambda = I_T + \rho XX^H$. Therefore, conditioned on X, the received signal Y has the following probability density function $$p(Y|X) = \frac{\exp[-tr(\Lambda^{-1}YY^H)]}{\pi^{TM_R}\det^{M_R}(\Lambda)}. \quad (3)$$

As depicted in FIG. 1, the receiver 150 uses a decoder 170 to compute the transmitted symbols from the received symbols. A variety of different decoding structures could be used. For example, and without limitation, the maximum likelihood (ML) decoder for the above channel model would be given by $$\hat{l} = \arg\min_{l=1,\ldots,L} p(Y|X_l). \quad (4)$$

The generalized likelihood ratio test (GLRT) decoder would be given by $$\hat{l} = \arg\min_{l,H} \|Y - \sqrt{\rho}X_l H\|_F, \quad (5)$$

where $\|\cdot\|_F$ denotes Frobenius norm, i.e., $\|R\|_F = \sqrt{tr(RR^H)}$. Note that both the ML receiver and the GLRT receiver require an exhaustive search over the codebooks.

An efficient but suboptimal decoder can be derived for the disclosed training technique. A channel estimate is formed based on the received signal Y. From the equations above, we have $$Y = \sqrt{\rho}(X_T + X_d)H + W. \quad (6)$$

We want to find a linear minimum mean-square error (LMMSE) estimate of the channel H based on Y and $X_T$, namely, we want to find a matrix C, such that $E\{\|H-CY\|^2\}$ is minimized. From the orthogonality principle, we have $E\{(H-CY)Y^H\} = 0$. Hence, $E\{HY^H\} = CE\{YY^H\}$ Using equation 6, we have $E\{HY^H\} = E\{H(\sqrt{\rho}(X_T + X_d)H + W)^H\} = \sqrt{\rho}M_R X_T^H$, where we have assumed that $E\{X_d\} = 0$, and we have used the facts that $E\{HH^H\} = M_R I_{M_T}$ and $E\{HW^H\} = E\{H\}E\{W^H\} = 0$. We also have $$E\{YY^H\} = \rho E\{(X_T + X_d)HH^H(X_T + X_d)^H\} + M_R I_T \quad (7)$$
$$= \rho E_{X_d} E_{H|X_d}\{(X_T + X_d)HH^H(X_T + X_d)^H\} + M_R I_T$$
$$= \rho M_R \underbrace{(X_T X_T^H + E\{X_d X_d^H\})}_{D} + M_R I_T$$

where we have applied the fact that $E_{H|X_d}\{HH^H\} = E_H\{HH^H\} = M_R I_{M_T}$ due to the independence between H and $X_d$. Therefore, we obtain $C = \sqrt{\rho}X_T^H(\rho D + I)^{-1}$. The LMMSE channel estimate is thus given by $$\tilde{H} = CY = \sqrt{\rho}X_T^H(\rho D + I)^{-1}Y. \quad (8)$$

The suboptimal decoder can then be written as $$\hat{l} = \arg\min_{l=1,\ldots,L} \|Y - \sqrt{\rho}(X_T + X_{d,l})\tilde{H}\|_F = \quad (9)$$
$$\arg\min_{l=1,\ldots,L} \|Y - \sqrt{\rho}X_T\tilde{H} - \sqrt{\rho}X_{d,l}\tilde{H}\|_F.$$

To control the complexity of the suboptimal decoder above, it is advantageous to further impose the condition that the information symbol $X_d$ be linear over the field of complex numbers. In particular, it is advantageous to employ linear dispersion (LD) codes. See, e.g., B. Hassibi and B. Hochwald, "High-Rate Codes that are Linear in Space and Time," IEEE Trans. Inform. Theory, Vol. 48, pp. 1804-24 (July 2002). LD codes use a linear modulation framework and the transmitted codeword is a linear combination of certain dispersion matrices with the transmitted symbols. Assume we transmit Q r-QAM symbols $\{s_q\}_{q=1}^Q$ over T coherent symbol intervals, the LD code $X_d$ is given by $$X_d = \sum_{q=1}^Q \alpha_q A_q + j\beta_q B_q \quad (10)$$

where the transmitted symbols $s_q$ have been decomposed into their real and imaginary parts $s_q = \alpha_q + j\beta_q$, $q = 1, \ldots, Q$, and $\{A_q, B_q\}_{q=1}^Q$ are the dispersion matrices that specify the codes. The rate of the training-based LD codes is $R = (Q/T)\log_2 r$. We assume that $\alpha_q$ and $\beta_q$ are random variables with zero mean and unit variance. To satisfy the energy constraint $E\{tr(XX^H)\} = T$, we also impose the dispersion matrices $X_T$ and $\{A_q, B_q\}_{q=1}^Q$ with the following normalization $$tr(X_T^H X_T) + \sum_{q=1}^Q tr(A_q^H A_q + B_q^H B_q) = T. \quad (11)$$

The inventors refer to the above as a "superimposed training-based linear dispersion" (STLD) system. The design goal is to choose the dispersion matrices $X_T$ and $\{A_q, B_q\}_{q=1}^Q$ such that the error rate is minimized.

It can be seen from equation (10) that an STLD system advantageously has a very simple encoder. Note that by confining to the LD structure, the matrix D in equation (7) is written as $$D = X_T X_T^H + \sum_{q=1}^Q (A_q A_q^H + B_q B_q^H). \quad (12)$$

Furthermore, as long as $Q \leq T \min(M_T, M_R)$; the suboptimal decoder set forth above can be implemented very efficiently by polynomial-time decoders, such as the sphere decoder (see M. O. Damen, A. Chkeif, and J. C. Belfiore, "Lattice Code Decoder for Space-Time Codes," IEEE Commun. Letters, Vol. 4, pp. 166-69 (May 2000)) and the nulling and cancellation receiver (see G. J. Foschini, "Layered Space-Time Architecture for Wireless Communication in a Fading Environment when using Multielement Antennas," Bell Labs Tech. J., Vol. 1, pp. 41-59 (Aut. 1996)). Note that the EM-based iterative receiver can also be employed for efficient decoding of STLD systems. For the TDM training-based scheme employing linear space-time codes, to facilitate polynomial-time suboptimal decoding, one must have $Q \leq T_d \min(M_T, M_R)$ Hence more symbols can be transmitted and decoded in polynomial-time in the STLD scheme. The above means that for a fixed data rate, the STLD scheme can use smaller constellations than the conventional training-based scheme while retaining an efficient decoder.

Some of the advantages of the disclosed training technique over conventional training-based schemes can be seen from the following intuitive arguments. As mentioned above, since it is possible to use the whole coherent interval to send information, for a fixed data rate, smaller constellations can be used, resulting in a possibly better noise margin. Therefore, if the channel estimate learned from known pilot $X_T$ is good, the overall performance of an STLD system would be better than the conventional training-based schemes. On the other hand, due to the CDM property of an STLD system, the interference from the information symbols might degrade the channel estimation. Therefore, a good design is to optimally balance the channel estimation error and the noise margin reduction. Furthermore, since the conventional TDM training-based scheme is a special case of CDM training-based scheme, an STLD system, when optimized correctly, should provide better performance.

The following sets forth an advantageous procedure for optimizing an STLD system for noncoherent MIMO channels.

Note that for STLD systems with the above-described optimal decoder or the above-described suboptimal decoder, an analytical expression for the block of bit error performance in intractable. Nevertheless, it turns out that simulation-based optimization with gradient estimation can be used to optimize the average block error probability (BLEP) for such STLD systems. The bit error performance can be optimized similarly.

Denote the set of dispersion matrices as $\theta \triangleq \{A_q, B_q, q=1, \ldots, Q, X_T\}$. We define a vector $\kappa$ that corresponds to the information streams $\kappa = [\alpha_1, \ldots, \alpha_Q, \beta_1, \ldots, \beta_Q]^T$. The set of all $r^Q$ possible vectors $\kappa$ is denoted as $\mathcal{C}$. To clarify the dependency of the STLD system on the information symbol vector $\kappa$ and the set of dispersion matrices $\theta$, we introduce the notation $X_{\kappa,\theta}$, i.e., $X_{\kappa,\theta} = X_T + \sum_{q=1}^{Q} \alpha_q A_q + j\beta_q B_q$. For the ML receiver set forth in equation (4), we obtain $$\hat{\kappa} = \arg\min_{\kappa \in C} \underbrace{\{tr[(I_T + \rho X_{\kappa,\theta} X_{\kappa,\theta}^H)^{-1} YY^H] + M_R \log\det(I_T + \rho X_{\kappa,\theta} X_{\kappa,\theta}^H)\}}_{g(Y,\kappa,\theta)}. \quad (13)$$

Note that for any transmitted information symbol vector $\kappa$, $g(Y, \kappa, \theta)$ is continuous with respect to the set of dispersion matrices $\theta$. Denote $\gamma(Y, \kappa, \theta)$ as the empirical BLEP for a given set of dispersion matrices $\theta$, a given information symbol vector $\kappa$, and a given received signal matrix $Y$, $\gamma(Y, \kappa, \theta) = 1$ if $\hat{\kappa} \neq \kappa$ and 0 otherwise. When the set of dispersion matrices $\theta$ is given, the average BLEP is obtained by $$\gamma(\theta) = \mathbb{E}\{\gamma(Y, \kappa, \theta)\} = \int \int \gamma(Y, \kappa, \theta) p(Y, \kappa|\theta) dY d\kappa. \quad (14)$$

The design goal is to solve the following constrained optimization problem $$\min_{\theta \in \Theta} \gamma(\theta),$$

with $$\Theta = \left\{\theta : tr(X_T^H X_T) + \sum_{q=1}^{Q} tr(A_q^H A_q + B_q^H B_q) \leq T\right\}. \quad (15)$$

As just described, the goal is to compute the optimal dispersion matrices $\theta$ so as to minimize the average block error probability $\gamma(\theta)$. Since it is difficult if not impossible to compute a closed-form expression for the average block error rate $\gamma(\theta)$ for an arbitrary dispersion matrices $\theta$, it is advantageous to resort to a stochastic gradient algorithm to optimize $\gamma(\theta)$. The aim of gradient estimation is to compute an unbiased estimate of the true gradient. Let $\hat{g}(\theta)$ denote an estimate of $\nabla_\theta \gamma(\theta)$, we require $\mathbb{E}\{\hat{g}(\theta)\} = \nabla_\theta \gamma(\theta)$. The simulation based algorithm (also known as the Robbins-Monro (R-M) algorithm) is of the form $\theta_{n+1} = \Pi_\Theta(\theta_n - \alpha_n \hat{g}(\theta_n))$ where $\theta_n$ is the parameter value at the beginning of iteration n, $\hat{g}(\theta)$ is an estimate of $\nabla_\theta \gamma(\theta)|_{\theta=\theta_n}$ from iteration n, $\{\alpha_n\}$ is a decreasing step size sequence of positive real numbers such that $\sum_{n=1}^{\infty} \alpha_n = \infty$ and $\sum_{n=1}^{\infty} \alpha_n^2 < \infty$, and the function $\Pi_\Theta$ projects each vector of $\mathbb{R}^d$ to the nearest point in $\Theta$. For the R-M algorithm to converge, the bias of gradient estimate $\hat{g}(\theta)$ should go to zero. The step sequence $\{\alpha_n\}$ is usual chosen of the harmonic series $\alpha_n = \alpha/n$ for all n, where $\alpha$ is a positive scalar. The R-M algorithm will converge with probability one to a local stationary point of $\gamma(\theta)$.

From equation (14), we have $$\gamma(\theta) = \mathbb{E}_\kappa \mathbb{E}_{Y|\kappa,\theta}\{\gamma(Y, \kappa, \theta)\}, \quad (16)$$

with $$\mathbb{E}_{Y|\kappa,\theta}\{\gamma(Y, \kappa, \theta)\} = \int \gamma(Y, \kappa, \theta) p(Y|\kappa, \theta) dY. \quad (17)$$

Because $p(Y|\kappa, \theta)$ is Gaussian, and it is continuously differentiable in $\theta$, it follows that $\gamma(\theta)$ is continuously differentiable in $\theta$. From equations (16) and (17), we have $$\nabla_\theta \gamma(\theta) = \mathbb{E}_\kappa\{\nabla_\theta \mathbb{E}_{Y|\kappa,\theta}\{\gamma(Y, \kappa, \theta)\}\} \quad (18)$$

$$= \mathbb{E}_\kappa \int \nabla_\theta [\gamma(Y, \kappa, \theta) p(Y|\kappa, \theta)] dY$$

$$= \mathbb{E}_\kappa \int [\nabla_\theta \gamma(Y, \kappa, \theta) p(Y|\kappa, \theta) +$$

$$\gamma(Y, \kappa, \theta) \nabla_\theta p(Y|\kappa, \theta)] dY.$$

To show $\mathbb{E}_\kappa \int \nabla_\theta [\gamma(Y, \kappa, \theta)] p(Y|\kappa, \theta) dY = 0$, note that $$\mathbb{E}_\kappa \int \nabla_\theta [\gamma(Y, \kappa, \theta)] p(Y|\kappa, \theta) dY = 0 \Longleftrightarrow \mathbb{E}_\kappa \int \nabla_\theta [1 - \gamma(Y, \kappa, \theta)] p(Y|\kappa, \theta) dY = 0 \quad (19)$$

The right hand side of equation (19) can be expanded as $$\sum_\kappa \int \nabla_\theta [1 - \gamma(Y, \kappa, \theta)] p(Y|\kappa, \theta) dY = \quad (20)$$

$$\int \sum_\kappa \nabla_\theta [\Pi_{\kappa' \neq \kappa}(g(Y, \kappa', \theta) - g(Y, \kappa, \theta) \geq 0)] p(Y|\kappa, \theta) dY$$

where $\Pi(\cdot)$ is an indicator function and where $g(Y, \kappa, \theta)$ is defined above in equation (13). Then we have $$\int \sum_\kappa \nabla_\theta [\Pi_{\kappa' \neq \kappa}(g(Y, \kappa', \theta) - g(Y, \kappa, \theta) \geq 0)] p(Y | \kappa, \theta) dY = \quad (21)$$

$$\int \sum_\kappa \left[ \sum_{\kappa' \neq \kappa} (\Pi_{\hat{\kappa} \neq \kappa'}(g(Y, \hat{\kappa}, \theta) - g(Y, \kappa, \theta) \geq 0)) \delta(g(Y, \kappa', \theta) - g(Y, \kappa, \theta)) \times \nabla_\theta (g(Y, \kappa', \theta) - g(Y, \kappa, \theta)) \right] p(Y | \kappa, \theta) dY$$

Now, $\forall y$ such that $g(Y, \kappa', \theta) = g(Y, \kappa, \theta)$, we have that $P(Y|\kappa', \theta) = P(Y|\kappa, \theta)$, but $$\nabla_\theta(g(Y, \kappa', \theta) - g(Y, \kappa, \theta)) = -\nabla_\theta(g(Y, \kappa, \theta) - g(Y, \kappa', \theta)). \quad (22)$$

Using equation (22) in the right hand side of equation (21), along with equation (19), we can conclude that $$\mathbb{E}_\kappa \int \nabla_\theta [\gamma(Y, \kappa, \theta)] p(Y|\kappa, \theta) dY = 0 \quad (23)$$

For the sub-optimal decoder, we assume that $$\nabla_\theta \gamma(\theta) = \mathbb{E}_\kappa \int \nabla_\theta [\gamma(Y, \kappa, \theta)] p(Y|\kappa, \theta) dY \quad (24)$$

where $\gamma(Y, \kappa, \theta)$ is evaluated for the decoder in equation (9). This assumption, it turns out, works well in practice.

Hence we have $$\nabla_\theta \Upsilon(\theta) = \mathbb{E}_\kappa \int \gamma(Y, \kappa, \theta) \nabla_\theta p(Y | \kappa, \theta) dY \quad (25)$$

$$= \mathbb{E}_\kappa \int \gamma(Y, \kappa, \theta) \frac{\nabla_\theta p(Y | \kappa, \theta)}{p(Y | \kappa, \theta)} p(Y | \kappa, \theta) dY$$

$$= \mathbb{E}_\kappa \mathbb{E}_{Y|\kappa, \theta} \{\gamma(Y, \kappa, \theta) \nabla_\theta \log p(Y | \kappa, \theta)\}$$

The gradient estimator in the form of equation (25) is typically referred to as the score function or likelihood ratio method. See, e.g., M. C. Fu, "Optimization via Simulation: A Review," Annals of Operations Research, Vol. 53, pp. 199-248 (1994).

The optimization problem given in equation (15) may then be solved via simulation by the following procedure. Assume at the k-th iteration the current set of dispersion matrices is $\theta_\kappa$, perform the following steps during the next iteration to generate $\theta_{\kappa+1}$:

First, generate samples as follows:
1. Draw M symbol vectors $\kappa_1, \kappa_2, \ldots, \kappa_M$ uniformly from the set $\mathbb{C}$.
2. Simulate M observations $Y_1, Y_2, \ldots, Y_M$ where each $Y_i$ is generated according to equation (2) using symbol vector $\kappa_i$.
3. Using the given decoding algorithm, decode $\kappa_i$ based on observations $Y_i$. Compute the empirical BLEP $\gamma(Y_i, \kappa_i, \theta_\kappa)$.

Second, compute the gradient estimation:

$$\hat{g}(\theta_k) = \frac{1}{M} \sum_{i=1}^{M} \gamma(Y_i, \kappa_i, \theta_k) [\nabla_\theta \log p(Y_i | \kappa_i, \theta) |_{\theta = \theta_k}] \quad (26)$$

where an explicit formula for $\nabla_\theta \log p(Y_i|\kappa_i, \theta)$ is given in the Appendix.

Third, update the dispersion matrices:

$$\theta_{\kappa+1} = \Pi_\ominus(\theta_\kappa - \alpha_\kappa \hat{g}(\theta_\kappa)) \quad (27)$$

where $\alpha_\kappa = c/k$ for some positive constant c. And for a given set of dispersion matrices $\theta = \{A_q, B_q, q=1, \ldots, Q, X_T\}$, $\Pi_\ominus(\theta) = \theta$ if $\theta \in \ominus$ and $\Pi_\ominus(\theta) = d \cdot \theta$ if $\theta \notin \ominus$, with the scaling factor given by $d = T^{1/2} [tr(X_T^H X_T) + \Sigma_{q=1}^{Q} tr(A_q^H A_q + B_q^H B_q)]^{-1/2}$.

In the above procedure, an initial feasible point can be randomly chosen. Better codes can be obtained by, for example, varying the initial condition and picking the best solution. Other methods can be applied to search the global optimum solution such as simulated annealing. See, e.g., H. Fang, F. Gong, and M. Qian, "Annealing of Iterative Stochastic Schemes," SIAM J. Control Optim., Vol. 35, pp. 1886-1907 (1997). It can be shown that if $\theta \in \ominus$ function $\Pi_\ominus$ projects $\theta$ to the nearest point in $\ominus$. In essence, when $\theta \notin \ominus$, the function $\Pi_\ominus$ simply scales $\theta$ such that the energy constraint [cf. equation (15)] is satisfied with an equality. In particular, we have the following fact: Let $\Phi = \{\phi \in \mathbb{R}^d : \|\phi\| \leq 1\}$, for any $\overline{\omega} \in \mathbb{R}^d$ with $\|\overline{\omega}\| > 1$, define $\psi = \arg\min_{\phi \in \Phi} \|\overline{\omega} - \phi\|$; then we have $\psi = \overline{\omega}/\|\overline{\omega}\|$. This is because clearly $\psi \notin \phi$, and for any $\phi \notin \Phi$, we have $\|\overline{\omega} - \phi\| \geq \|\overline{\omega}\| - \|\phi\| \geq \|\overline{\omega} - \psi\|$. Therefore, one can conclude that the projection function in equation (27) projects $\theta$ to the nearest point in the constraint set $\ominus$.

The above procedure advantageously can provide an optimal STLD system for various types of receiver structure. In general, it should be noted that codes optimized for an ML decoder may not be optimal for the suboptimal decoder.

From the above procedure, the set of optimum dispersion matrices $\theta = \{A_q, B_q, q=1, \ldots, Q, X_T\}$ depend on the number of transmit antennas $M_T$, the number of receive antennas $M_R$, and the constellation set A. The searching result $\theta$ also depends on the operating SNR as both the empirical BLEP $\gamma(Y, \kappa, \theta)$ and $\nabla_\theta \log p(Y, |\kappa, \theta)$ depend on SNR (see Appendix). Therefore, the disclosed code design will also depend on SNR. However, due to the continuity of the BLEP with respect to SNR, it is expected that the codes optimized for a particular SNR work fine for a wide range of SNR of interest. Note that for a conventional training-based scheme, the optimal design should involve choosing the training data $X_T$, the training power $\rho_T$, and the training interval length $T_T$. The STLD scheme, as a generalization of the TDM training-based scheme, automatically takes into account the optimization of these parameters. For example, the simulation-based design described above will automatically optimize the power of the training signal $tr(X_T^H X_T)$.

FIG. 2 through 8 provides several examples to illustrate the performance of STLD systems obtained by the above-described simulation-based optimization with gradient estimation. The performance is compared with some conventional training-based schemes employing codes designed for coherent detection.

Figure 2:
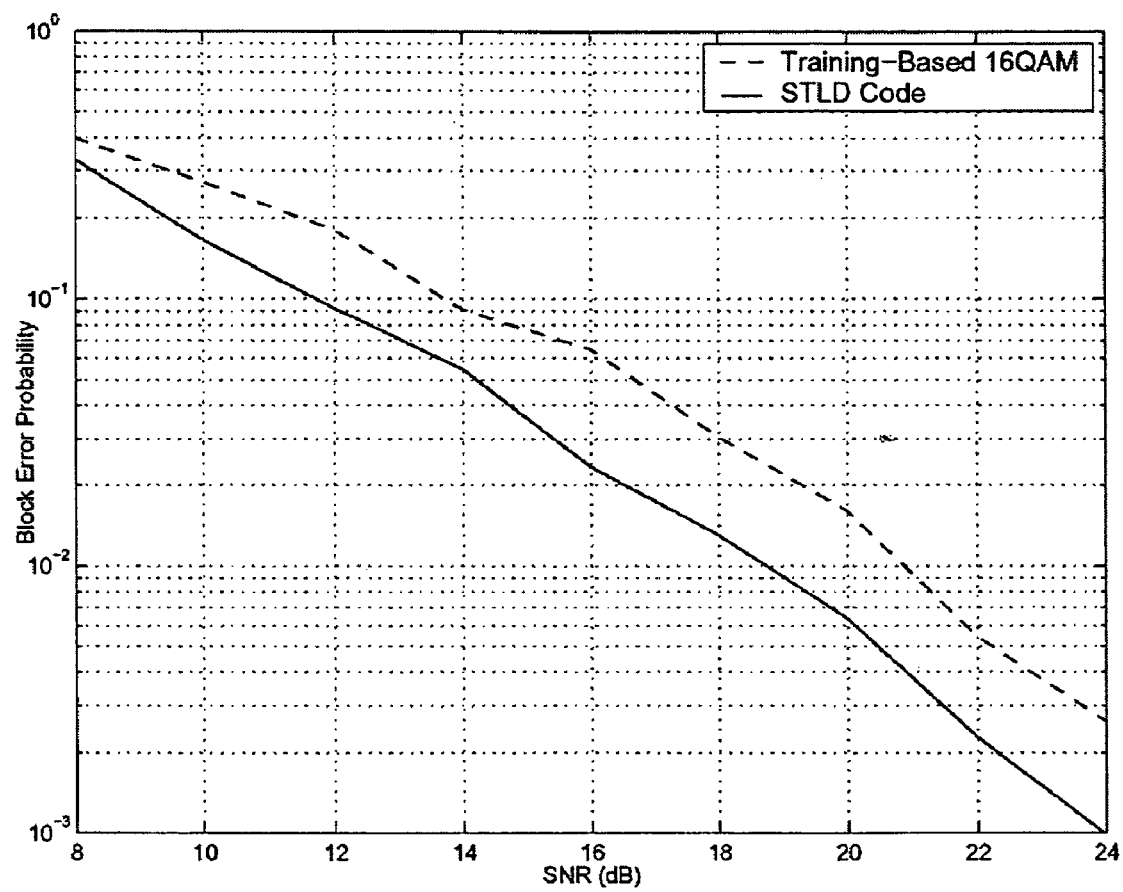
FIGS. 2 through 8 illustrate the performance of the disclosed techniques in comparison with some conventional training-based schemes.

FIG. 2: T=2, $M_T$=1, $M_R$=2, and R=2 with ML decoder: In the first example, we consider the case of a single transmit antenna and two receive antennas with a data rate 2 bits/sec/Hz and a coherence interval T=2. FIG. 2 reports the block error probability versus SNR for an STLD system and a conventional training-based scheme. For the traditional training-based scheme, to achieve data rate 2 bits/sec/Hz we employ the 16 QAM constellation after the training phase. For the STLD scheme, we use QPSK constellation and set Q=2. It can be seen that above-disclosed STLD system offers significant gain over the conventional training-based scheme. The performance gain is about 2 dB when the BLEP is around $10^{-2}$.

Figure 3:
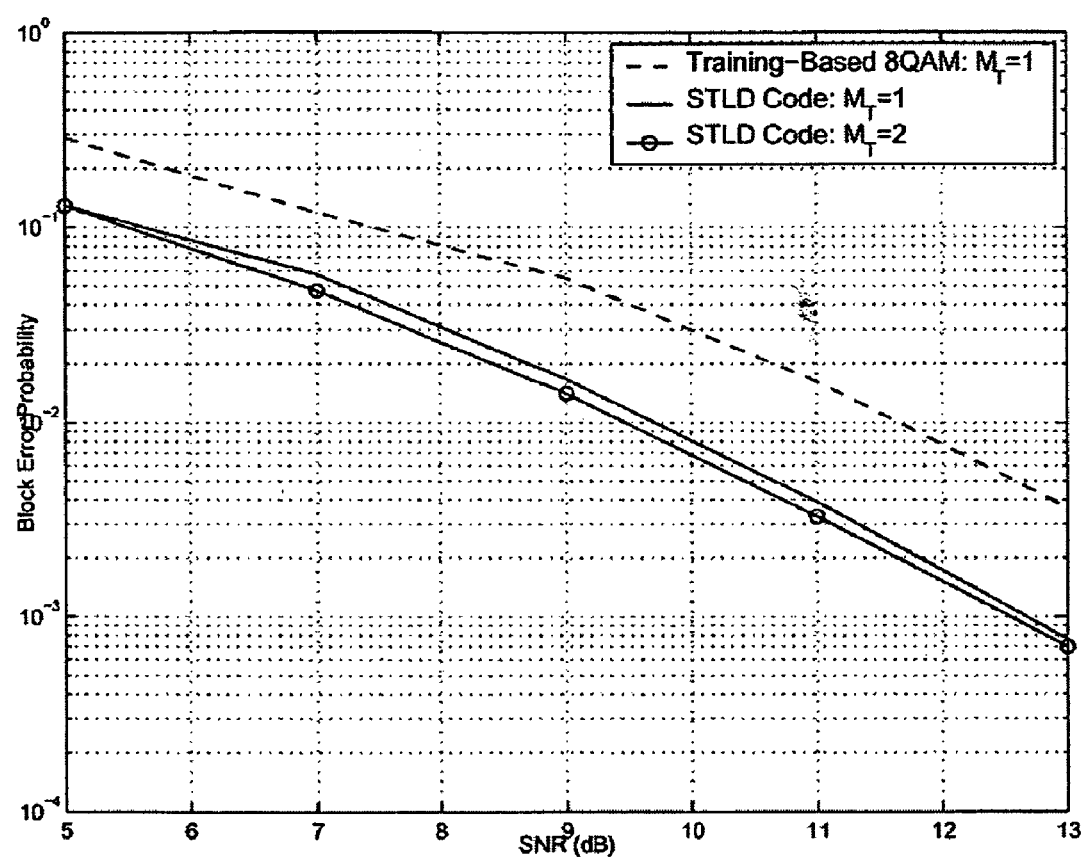

FIG. 3: T=3, $M_T$=1--2, $M_R$=5, and R=2 with ML decoder: For the STLD scheme, we employ the QPSK constellation and set Q=3. We compare the STLD system with a training-based scheme employing a single transmit antenna and the 8

QAM constellation during the data transmission phase, resulting in rate 2 bits/sec/Hz. As can be seen from FIG. 3, the STLD scheme performs significantly better than the conventional training-based method especially for high SNR. The performance gain is as large as 2 dB when the BLEP is around $10^{-2}$. The STLD system designed with two transmit antennas provides slightly better performance than that with a single transmit antenna.

Figure 4:
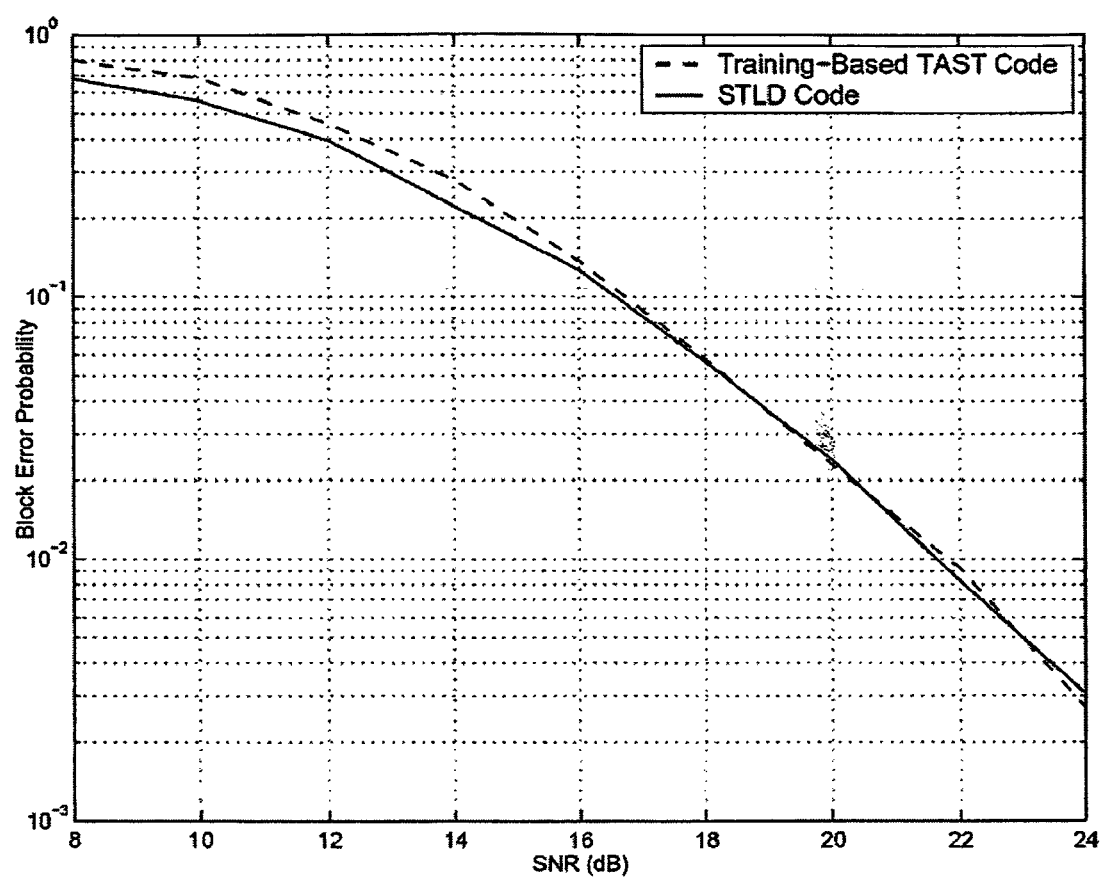

FIG. 4: T=4, $M_T$=2, $M_R$=2, and R=3 with MD decoder: In this setting, for the TDM training-based scheme, two channel uses of each coherent interval are allocated to training. In the data transmission phase, a TAST code is employed with the 8 QAM constellation, resulting in a data rate of 3 bits/sec/Hz. For the STLD scheme, we set Q=6 and employ the QPSK constellation. From FIG. 4, it can be seen that the STLD system performs slightly better than the training-based TAST code at low SNR.

Figure 5:
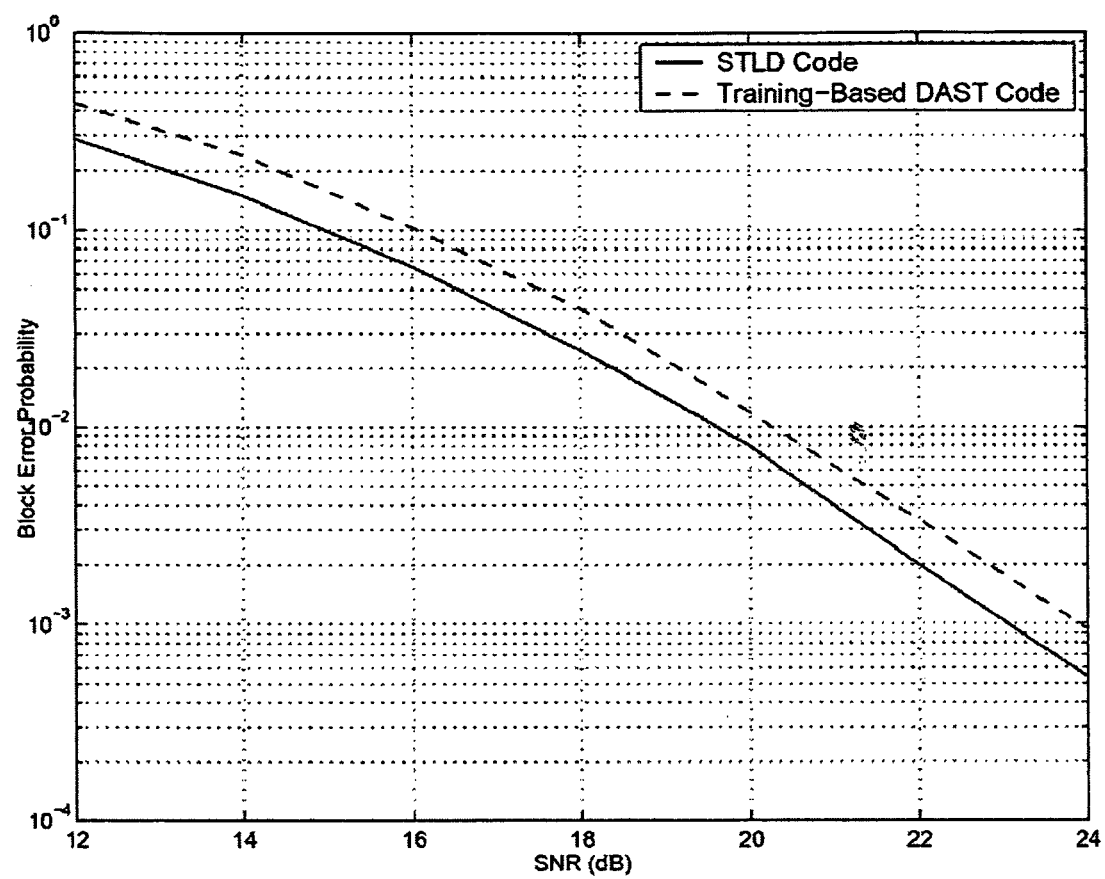

FIG. 5: T=8, $M_T$=4, $M_R$=1, and R=1.5 with ML decoder: For the STLD scheme, we set Q=6 and employ the QPSK constellation. We compare it with the training-based scheme where four channel uses of each coherent interval are allocated to training, followed by a DAST code with the 8 QAM constellation, resulting in an overall data rate of 1.5 bits/sec/Hz. From FIG. 5, it can be seen that the STLD system offers about 1 dB gain over the DAST code at BLEP $10^{-1}$.

Figure 6:
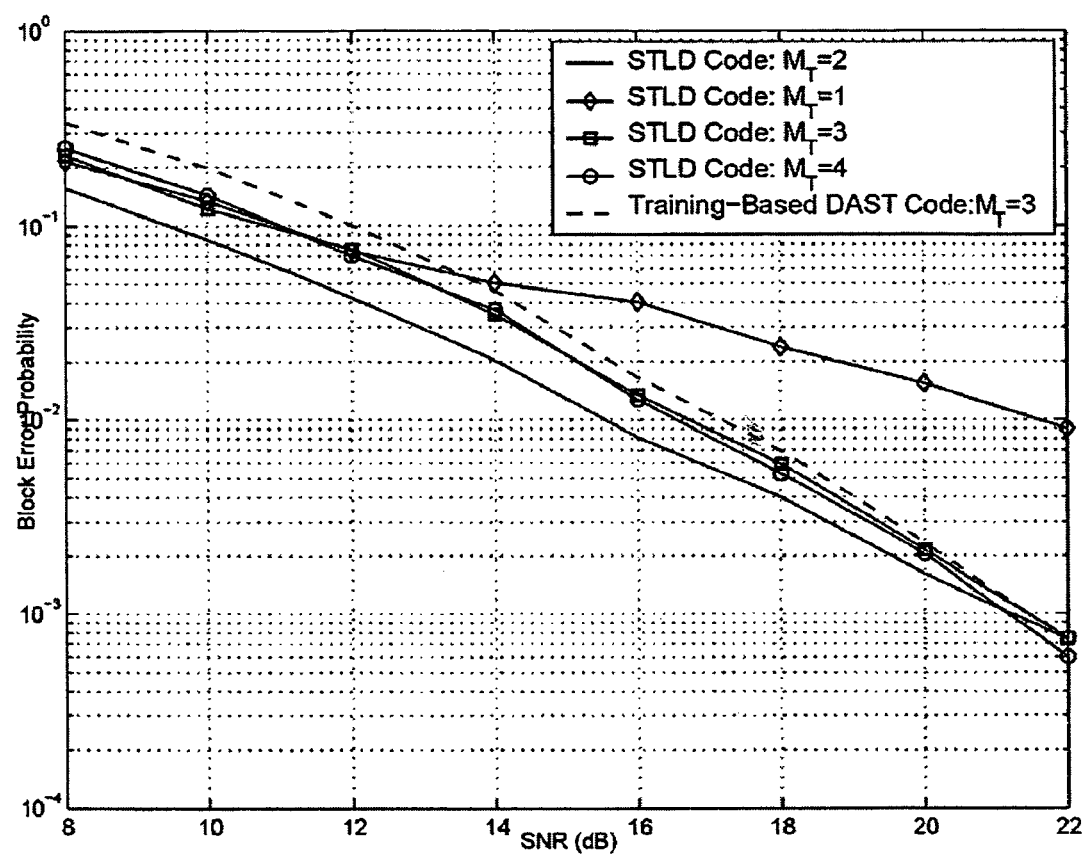

FIG. 6: T=6, $M_T$=1,2,3, or 4, $M_R$=1, and R=1 with ML decoder: FIG. 6 reports the performance of the optimal STLD systems designed for different number of active antennas. In all cases, we fix the length of the coherent interval (T=6), the number of receive antennas ($M_R$=1), and the data rate (R=1). It is seen that for low SNR scenarios, fewer transmit antennas should be used; while for high SNR scenarios, more transmit antennas should be used. In this example activating four transmit antennas provides the optimal performance at very high SNR. Note that for this particular example, activating two transmitting antennas provides near optimal performance for a wide range of SNRs of interest. The above observations verify that for delay limited noncoherent MIMO channels, the choice of the number of active antennas depends on the operating SNR. Note that with three transmit antennas, the STLD system performs uniformly better than the training-based DAST code for a wide range of SNRs.

Figure 7:
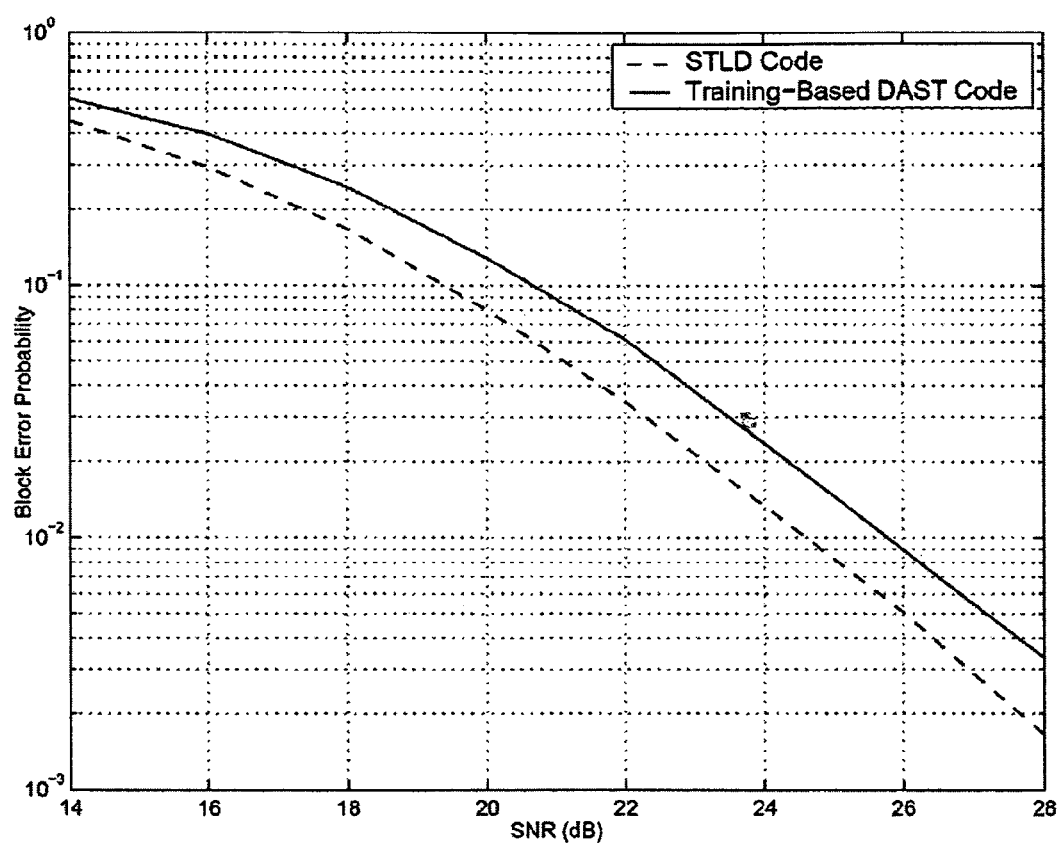

FIG. 7: T=6, $M_T$=3, $M_R$=1, and R=2 with suboptimal decoder: In this example, we demonstrate that the proposed technique can also be used to design optimal STLD systems with the above-described suboptimal receiver structures. We compare the STLD system (using the decoder set forth in equation (9)) with a training-based DAST code. For the training-based DAST scheme, three out of six coherent intervals are allocated to training; and the 16 QAM constellation is employed during the data transmission phase. For the STLD system we choose Q=6 and employ the QPSK constellation. Note that the suboptimal receiver of the STLD scheme can be implemented efficiently with the sphere decoder. From FIG. 7, the performance gain of the STLD system over the training-based DAST code is more than 1 dB when the BLEP is around $10^{-2}$.

Figure 8:
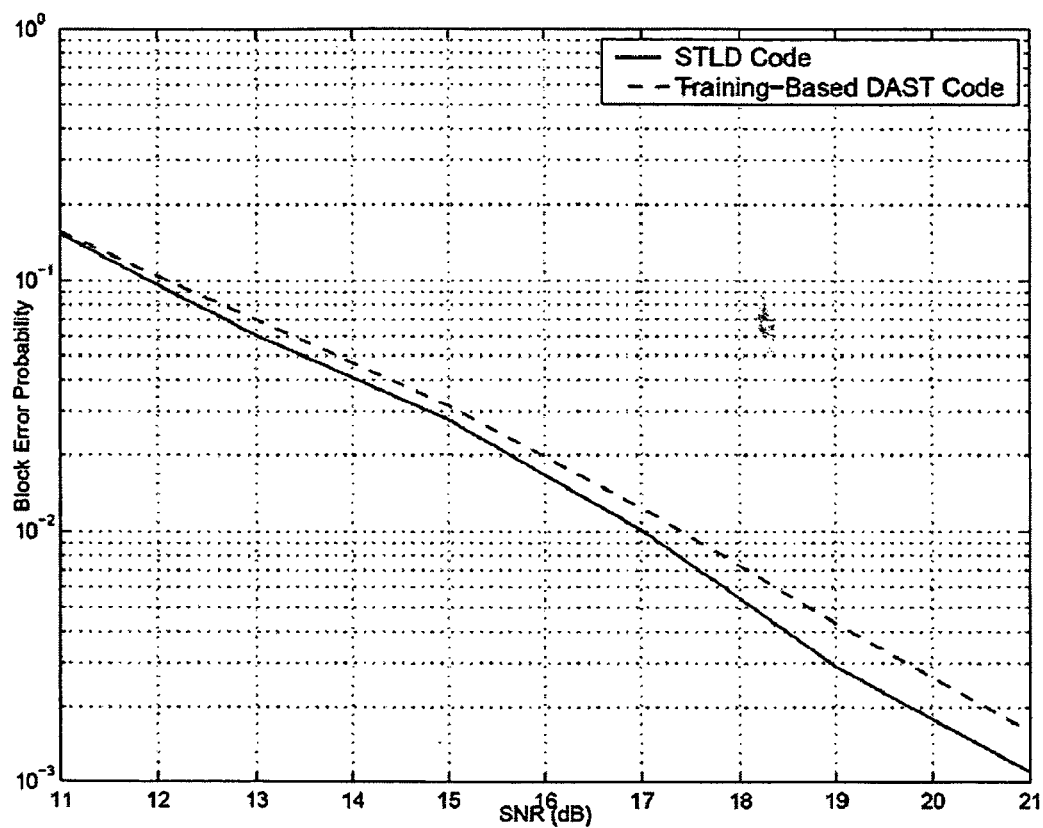

FIG. 8: T=6, $M_T$=3, $M_R$=1, and R=1 with suboptimal decoder: The setting here is similar to that of FIG. 6, and here we focus on the suboptimal decoder. FIG. 8 compares the performance of the STLD system with the training-based DAST code. As can be seen from FIG. 8, the STLD system outperforms the training-based DAST code for a wide range of SNRs.

While exemplary drawings and specific embodiments of the present invention have been described and illustrated, it is to be understood that that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention as set forth in the claims that follow and their structural and functional equivalents.

APPENDIX

Calculation of $\nabla_\theta \log p(Y|\kappa, \theta)$

In the appendix, the gradients required by the score function in equation (25) are computed. From equation (3), we have $f \triangleq \log p(Y|\kappa, \theta) = -\text{tr}\{\Lambda^{-1} YY^H\} - M_R \log \det(\Lambda) - TM_R \log \pi$. To evaluate $\nabla_\theta f = \nabla_\theta \log p(Y|\kappa, \theta)$, we only need to evaluate $\nabla_\theta f_1$ and $\nabla_\theta f_2$, where we have defined $f_1 \triangleq -\text{tr}\{\Lambda^{-1} YY^H\}$ and $f_2 \triangleq -M_R \log \det(\Lambda)$. For the training-based scheme in equation (6), the covariance matrix $\Lambda$ of any column of Y is $\Lambda = I + \rho XX^H = I + \rho(X_T + X_d)(X_T + X_d)^H$ The matrices $X_T$, $\{A_q B_q\}_{q=1}^Q$ can be decomposed into real and imaginary parts $X_T = X_{T,R} + jX_{T,I}$, $A_q = A_{R,q} + jA_{I,q}$, $B_q = B_{R,q} + jB_{I,q}$, $q=1, \ldots, Q$. We first compute the gradient of $f_1$ with respect to $A_{R,q}$. The (n, l)th entry of the gradient of $f_1(A_{R,q})$ is $$\left[\frac{\partial f_1(A_{R,q})}{\partial A_{R,q}}\right]_{n,l} = \lim_{\delta \to 0} \frac{f_1(A_{R,q} + \delta \zeta_n \eta_l^T) - f_1(A_{R,q})}{\delta},$$

where $\zeta_n$ and $\eta_l$ are T-dimensional and $M_T$-dimensional unit column vectors with one in the nth and lth entries, respectively, and zeros elsewhere. Note that $$X_d = \sum_{q=1}^Q \alpha_q A_q + j\beta_q B_q =$$

$$\sum_{q=1}^Q \alpha_q A_{R,q} + j\sum_{q=1}^Q \alpha_q A_{I,q} + j\sum_{q=1}^Q \beta_q B_{R,q} - \sum_{q=1}^Q \beta_q B_{I,q}.$$

We have $$X_{d,\delta,n,l}^{A_{R,q}} = X_d + \alpha_q \delta \zeta_n \eta_l^T.$$

Therefore, we obtain $$\Lambda_{\delta,n,l}^{A_{R,q}} = I + \rho(X + \alpha_q \delta \zeta_n \eta_l^T)(X + \alpha_q \delta \zeta_n \eta_l^T)^H$$
$$= I + \rho XX^H + \alpha_q \delta \rho(X\eta_l \zeta_n^T + \zeta_n \eta_l^T X^H)$$
$$= \Lambda + \alpha_q \delta \underbrace{\rho(X\eta_l \zeta_n^T + \zeta_n \eta_l^T X^H)}_{G_{n,l}^{A_R}}.$$

Furthermore, we obtain $$f_1(A_{R,q} + \delta \zeta_n \eta_l^T) = -\text{tr}\left\{\Lambda^{-1}\{I + \alpha_q \delta G_{n,l}^{A_R} \Lambda^{-1} + o(\delta)\}^{-1} YY^H\right\}$$
$$= -\text{tr}\{\Lambda^{-1}(I - \alpha_q \delta G_{n,l}^{A_R} \Lambda^{-1} + o(\delta))YY^H\}$$
$$= -\text{tr}\{\Lambda^{-1} YY^H\} + \alpha_q \delta \text{tr}\{\Lambda^{-1} G_{n,l}^{A_R} \Lambda^{-1} YY^H\} + o(\delta).$$

Therefore, we have $$\left[\frac{\partial f_1(A_{R,q})}{\partial A_{R,q}}\right]_{n,l} = \lim_{\delta\to 0}\frac{f_1(A_{R,q}+\delta\varsigma_n\eta_l^T)-f_1(A_{R,q})}{\delta} = \alpha_q tr\{\Lambda^{-1}G_{n,l}^{A_R}\Lambda^{-1}YY^H\}.$$

Similarly, we have $$f_2(A_{R,q}+\delta\varsigma_n\eta_l^T) = -M_R\log\det\Lambda - M_R\log\det(I+\alpha_q\delta G_{n,l}^{A_q}\Lambda^{-1}+o(\delta))$$
$$= -M_R\log\det\Lambda - M_R tr\log(I+\alpha_q\delta G_{n,l}^{A_q}\Lambda^{-1}+o(\delta))$$
$$= -M_R\log\det\Lambda - M_R\alpha_q\delta tr(G_{n,l}^{A_q}\Lambda^{-1})+o(\delta),$$

where we have applied log det(•)=tr log(•), and log(I+A)=A−A$^2$/2+ .... Therefore, $$\left[\frac{\partial f_1(A_{R,q})}{\partial A_{R,q}}\right]_{n,l} = \lim_{\delta\to 0}\frac{f_2(A_{R,q}+\delta\varsigma_n\eta_l^T)-f_2(A_{R,q})}{\delta} = -M_R\alpha_q tr(G_{n,l}^{A_R}\Lambda^{-1}).$$

Similarly, we have the other gradients as follows:

$$\left[\frac{\partial f_1(A_{l,q})}{\partial A_{l,q}}\right]_{n,l} = \alpha_q tr\{\Lambda^{-1}G_{n,l}^{A_l}\Lambda^{-1}YY^H\},$$

$$\left[\frac{\partial f_2(A_{l,q})}{\partial A_{l,q}}\right]_{n,l} = -M_R\alpha_q tr(G_{n,l}^{A_l}\Lambda^{-1}),$$

$$\left[\frac{\partial f_1(B_{R,q})}{\partial B_{R,q}}\right]_{n,l} = \beta_q tr\{\Lambda^{-1}G_{n,l}^{B_R}\Lambda^{-1}YY^H\},$$

$$\left[\frac{\partial f_2(B_{R,q})}{\partial B_{R,q}}\right]_{n,l} = -M_R\beta_q tr(G_{n,l}^{B_R}\Lambda^{-1}),$$

$$\left[\frac{\partial f_1(B_{l,q})}{\partial B_{l,q}}\right]_{n,l} = \beta_q tr\{\Lambda^{-1}G_{n,l}^{B_l}\Lambda^{-1}YY^H\},$$

$$\left[\frac{\partial f_2(B_{l,q})}{\partial B_{l,q}}\right]_{n,l} = -M_R\beta_q tr(G_{n,l}^{B_l}\Lambda^{-1}),$$

$$\left[\frac{\partial f_1(X_{\tau,R})}{\partial B_{\tau,R}}\right]_{n,l} = tr\{\Lambda^{-1}G_{n,l}^{X_{\tau,R}}\Lambda^{-1}YY^H\},$$

$$\left[\frac{\partial f_2(X_{\tau,R})}{\partial X_{\tau,R}}\right]_{n,l} = -M_R tr(G_{n,l}^{X_{\tau,R}}\Lambda^{-1}),$$

$$\left[\frac{\partial f_1(X_{\tau,l})}{\partial B_{\tau,l}}\right]_{n,l} = tr\{\Lambda^{-1}G_{n,l}^{X_{\tau,l}}\Lambda^{-1}YY^H\},$$

$$\left[\frac{\partial f_2(X_{\tau,l})}{\partial X_{\tau,l}}\right]_{n,l} = -M_R tr(G_{n,l}^{X_{\tau,l}}\Lambda^{-1}),$$

$$G_{n,l}^{A_l} = j\rho(X\eta_l\varsigma_n^T + \varsigma_n\eta_l^T X^H),$$
$$G_{n,l}^{B_R} = j\rho(X\eta_l\varsigma_n^T + \varsigma_n\eta_l^T X^H),\ G_{n,l}^{B_l} = -\rho(X\eta_l\varsigma_n^T + \varsigma_n\eta_l^T X^H),$$
$$G_{n,l}^{X_{\tau,R}} = \rho(X\eta_l\varsigma_n^T + \varsigma_n\eta_l^T X^H),\ G_{n,l}^{X_{\tau,l}} = j\rho(X\eta_l\varsigma_n^T + \varsigma_n\eta_l^T X^H).$$

What is claimed is:

1. A method of wireless communication comprising:
receiving information symbols to be transmitted to a receiver; receiving training symbols known to the receiver; and
arranging the information symbols and the training symbols so that the training symbols are not transmitted in a single training phase but are interspersed with the information symbols in a superimposed transmission, the superimposed transmission occuring over a noncoherent communication channel with multiple antennas being utilized for either the superimposed transmission or for reception at the receiver, the receiver using its knowledge of the training symbols and of the arrangement of training symbols within the superimposed transmission to generate an estimate of characteristics of the noncoherent communication channel having a coherent interval of T, and the superimposed transmission of the training symbols and the information symbols occupying the whole coherent interval.

2. The method of claim 1 wherein there are $M_T$ transmit antennas and wherein the superimposed transmission can be represented by a T×$M_T$ matrix X where $$X=X_T+X_d$$

and where $X_T$ is a matrix representing the training symbols and $X_d$ is a matrix representing the information symbols.

3. The method of claim 1 wherein the information symbols are codewords which are a linear combination of dispersion matrices with symbols to be transmitted.

4. The method of claim 3 wherein the training symbols and the dispersion matrices are generated using simulation-based optimization with gradient estimation.

5. A transmitter for wireless communication comprising:
one or more antennas for transmitting across a communication channel to a receiver;
a symbol arranger which receives information symbols to be transmitted to the receiver and training symbols known to the receiver and superimposes the information symbols and the training symbols into a superimposed transmission, the training symbols arranged so as to be interspersed with the training symbols in the superimposed transmission rather than being arranged in a single training phase; and
an encoder which generates the information symbols in accordance with a coding arrangement, the information symbols generated by the encoder being a linear combination of dispersion matrices with symbols to be transmitted.

6. The transmitter of claim 5 wherein the communication channel has a coherent interval of T and wherein the superimposed transmission of the training symbols and the information symbols occupies the whole coherent interval.

7. The transmitter of claim 6 wherein the transmitter has $M_T$ antennas and wherein the superimposed transmission can be represented by a T×$M_T$ matrix X where $$X=X_T+X_d$$

and where $X_T$ is a matrix representing the training symbols and $X_d$ is a matrix representing the information symbols.

8. A receiver for wireless communication comprising:
one or more antennas for receiving a transmission from across a communication channel, the transmission being a superposition of information symbols and training symbols;
a training symbol extractor which receives the transmission and which extracts the training symbols, the training symbols being arranged not in a single training phase but interspersed with the information symbols in the transmission; and
a channel estimator which receives the training symbols and which estimates characteristics of the communication channel based on the training symbols, and a decoder which decodes the information symbols in accordance with a coding arrangement and operates in accordance with $$\arg\min_{l=1,\ldots,L} \left\| Y - \sqrt{\rho}\,(X_T + X_{d,l})\tilde{H} \right\|_F$$

where Y is the transmission received, $X_T$ is a representation of the training symbols, $X_{d,l}$ is a representation of a possible information symbol, and $\tilde{H}$ is an estimate of characteristics of the communication channel as provided by the channel estimator.

9. The receiver of claim 8 wherein the information symbols decoded by the decoder are a linear combination of dispersion matrices with symbols to be decoded.

10. The receiver of claim 9 wherein the training symbols and the dispersion matrices are generated using simulation-based optimization with gradient estimation.

* * * * *